United States Patent
Bisson

(10) Patent No.: US 10,436,149 B2
(45) Date of Patent: Oct. 8, 2019

(54) GAS TURBINE ENGINE EXHAUST MIXER WITH LOBES CROSS-OVER OFFSET

(71) Applicant: PRATT & WHITNEY CANADA CORP., Longueuil (CA)

(72) Inventor: Francois Bisson, Vallee-Jonction (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 353 days.

(21) Appl. No.: 15/249,847

(22) Filed: Aug. 29, 2016

(65) Prior Publication Data
US 2017/0089296 A1 Mar. 30, 2017

Related U.S. Application Data

(60) Provisional application No. 62/234,192, filed on Sep. 29, 2015.

(51) Int. Cl.
F02K 1/48 (2006.01)
F02K 3/06 (2006.01)

(52) U.S. Cl.
CPC ............... *F02K 1/48* (2013.01); *F02K 3/06* (2013.01); *F05D 2250/61* (2013.01)

(58) Field of Classification Search
CPC ... F02K 1/48; F02K 3/06; F02K 1/386; F05D 2250/61
USPC .......................................................... 60/770
See application file for complete search history.

(56) References Cited

U.S. PATENT DOCUMENTS

| | | | | |
|---|---|---|---|---|
| 2,968,150 A * | 1/1961 | Goebel | ................. | F02K 1/48 181/215 |
| 3,084,507 A * | 4/1963 | Kleinhans et al. | ... | B64C 25/423 239/265.13 |
| 4,077,206 A * | 3/1978 | Ayyagari | ................. | F02K 1/386 181/220 |
| 5,638,675 A * | 6/1997 | Zysman | ................. | F02K 1/386 181/220 |
| 5,884,472 A * | 3/1999 | Presz, Jr. | ................. | F02K 1/36 239/265.17 |
| 6,606,854 B1 * | 8/2003 | Siefker | ................. | B63G 13/02 181/213 |
| 7,114,323 B2 * | 10/2006 | Schlinker | ................. | F02K 1/386 60/204 |
| 8,516,791 B2 * | 8/2013 | Perveiler | ................. | F02C 7/14 60/226.1 |
| 2007/0000234 A1 * | 1/2007 | Anderson | ................. | F02K 1/04 60/262 |
| 2008/0105487 A1 * | 5/2008 | Loheac | ................. | F02K 1/386 181/220 |

(Continued)

FOREIGN PATENT DOCUMENTS

EP 1894616 3/2008
EP 2778380 9/2014
(Continued)

OTHER PUBLICATIONS

European Search Report received in corresponding EP Application No. 16191570 dated May 12, 2017.

*Primary Examiner* — J. Todd Newton
(74) *Attorney, Agent, or Firm* — Norton Rose Fulbright Canada LLP

(57) ABSTRACT

An exhaust mixer for a gas turbine engine has a lobe cross-over offset. The proposed geometric feature leads to improved exhaust performance and potential weight reduction.

14 Claims, 5 Drawing Sheets

(56) References Cited

U.S. PATENT DOCUMENTS

| | | | | |
|---|---|---|---|---|
| 2011/0265447 A1 * | 11/2011 | Cunningham | ............ | F02K 1/48 60/264 |
| 2015/0013341 A1 * | 1/2015 | Cunningham | .......... | F01D 25/30 60/772 |
| 2015/0075169 A1 * | 3/2015 | Cunningham | .......... | F02K 1/386 60/770 |
| 2015/0107225 A1 | 4/2015 | Dindar et al. | | |
| 2015/0337761 A1 * | 11/2015 | Marini | .................... | F01D 9/041 415/144 |
| 2016/0032865 A1 * | 2/2016 | Yan | .......................... | F02C 3/10 60/263 |
| 2016/0326983 A1 * | 11/2016 | Marini | .................... | F01D 9/041 |
| 2017/0089296 A1 * | 3/2017 | Bisson | ...................... | F02K 1/48 |

FOREIGN PATENT DOCUMENTS

| | | | | |
|---|---|---|---|---|
| GB | 2160265 | | 12/1985 | |
| GB | 2160265 A | * | 12/1985 | ............. F02K 1/386 |
| JP | 2003065156 A | * | 3/2003 | ............... F02K 1/48 |
| JP | 2003314368 A | * | 11/2003 | ............... F02K 1/48 |

\* cited by examiner

GAS TURBINE ENGINE EXHAUST MIXER WITH LOBES CROSS-OVER OFFSET

CROSS REFERENCE TO RELATED APPLICATION

The present application claims priority on U.S. provisional patent application No. 62/234,192 filed on Sep. 29, 2015, the content of which is herein incorporated by reference.

TECHNICAL FIELD

The application relates generally to aircraft gas turbine engines and, more particularly, to an exhaust mixer suitable for bypass gas turbine engines.

BACKGROUND OF THE ART

A typical turbofan forced mixer consists of a number of mixer lobes that alternately extend radially outwards (crests) and inwards (valleys) to create the geometry necessary for forced mixing. In the current designs of turbofan mixers, the transition from annular gaspath to the forced mixer is designed such that the curve that forms the crest line and the curve that forms the valley line depart from the annular gas path at the same axial location, defined as the cross-over point. Applicant has found that this may lead to diffusion problems.

SUMMARY

In one general aspect, there is provided an exhaust mixer for a gas turbine engine, the mixer having a lobe cross-over offset. That is instead of the curves that define the crests and valleys originating from the same axial location, the respective points of origin of the valleys and crests are offset axially relative to each other.

In accordance with another general aspect, there is provided a turbofan forced mixer comprising a circumferential array of alternating crests and valleys, the respective points of origin of the valleys and crests being axially offset relative to each other.

In accordance with another general aspect, there is provided a turbofan exhaust mixer comprising an annular wall extending around a central axis, the annular wall extending axially from an upstream end to a downstream end and defining a plurality of circumferentially distributed lobes, the lobes including alternating valleys and crests, the valleys and crests having respective upstream ends, the upstream ends of at least some of the valleys being axially spaced-apart from the upstream ends of the crests by a lobe cross-over offset distance (O).

In accordance with a further general aspect, there is provided a gas turbine engine comprising: an annular core flow passage for channelling a core flow along an axis of the engine, a bypass passage extending concentrically about the core flow passage for axially channelling bypass air; and an exhaust mixer, the exhaust mixer having an annular wall concentrically disposed relative to the axis of the engine and extending axially between an upstream end and a downstream end, the annular wall defining a plurality of circumferentially distributed lobes forming alternating crests and valleys, the crests protruding radially outwardly into the bypass passage and the valleys protruding radially inwardly into the core flow passage, wherein an origin of the crests at the upstream end of the annular wall of the exhaust mixer is axially offset from an origin of the valleys by a lobe cross-over offset distance (O).

In accordance with a still further general aspect, there is provided an exhaust mixer for a gas turbine engine of the type having an annular core flow passage for channelling a core flow along an axis of the engine, and a bypass passage extending concentrically about the core flow passage for axially channelling bypass air; the exhaust mixer comprising: an annular wall adapted to be concentrically disposed relative to the axis of the engine and extending axially between an upstream end and a downstream end, the annular wall defining a plurality of circumferentially distributed alternating crests and valleys, the crests being configured to protrude radially outwardly into the bypass passage while the valleys are configured to protrude radially inwardly into the core flow passage, wherein an upstream end of at least some of the crests is axially offset from an upstream end of the valleys.

DESCRIPTION OF THE DRAWINGS

Reference is now made to the accompanying figures, in which.

DETAILED DESCRIPTION

Figure 1:
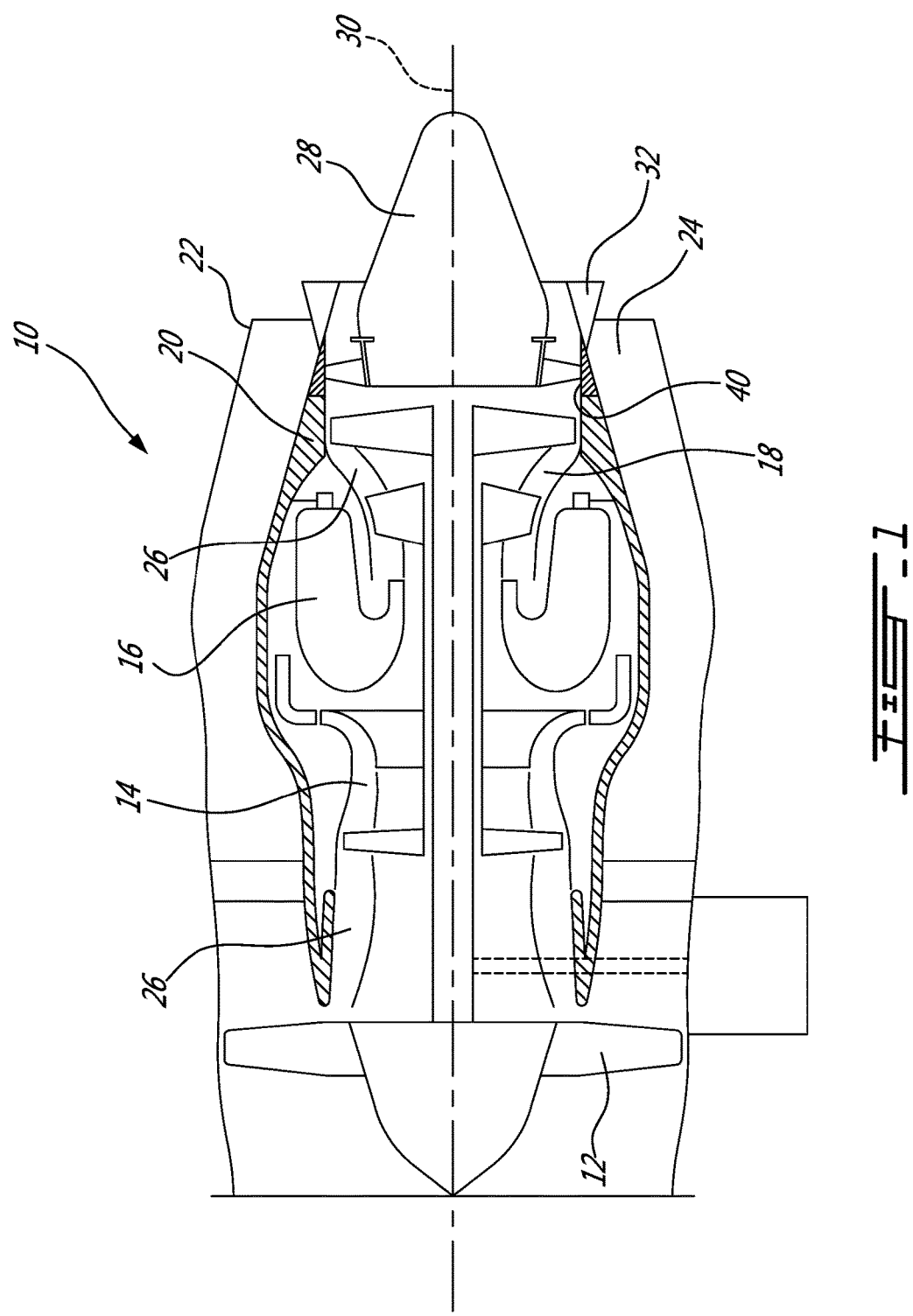
FIG. 1 is a schematic cross-section view of a turbofan gas turbine engine having an exhaust mixer.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a core flow path 26 which is defined within the first casing 20 and allows the flow to circulate through the multistage compressor 14, combustor 16 and turbine section 18 as described above.

At the aft end of the engine 10, an axisymmetrical bullet 28 is centered on a longitudinal axis 30 of the engine 10 and defines a downstream portion of an inner wall of the core flow path 26 so that the combustion gases flow therearound. An annular exhaust mixer 32 surrounds at least a portion of the bullet 28, the mixer 32 acting as a rearmost portion of the outer wall defining the core flow path 26 and a rearmost portion of the inner wall defining the bypass passage 24. The hot combustion gases from the core flow path 26 and the cooler air from the bypass passage 24 are, thus, mixed together by the mixer 32 at the exit thereof such as to produce an exhaust with a reduced temperature.

Figure 2:
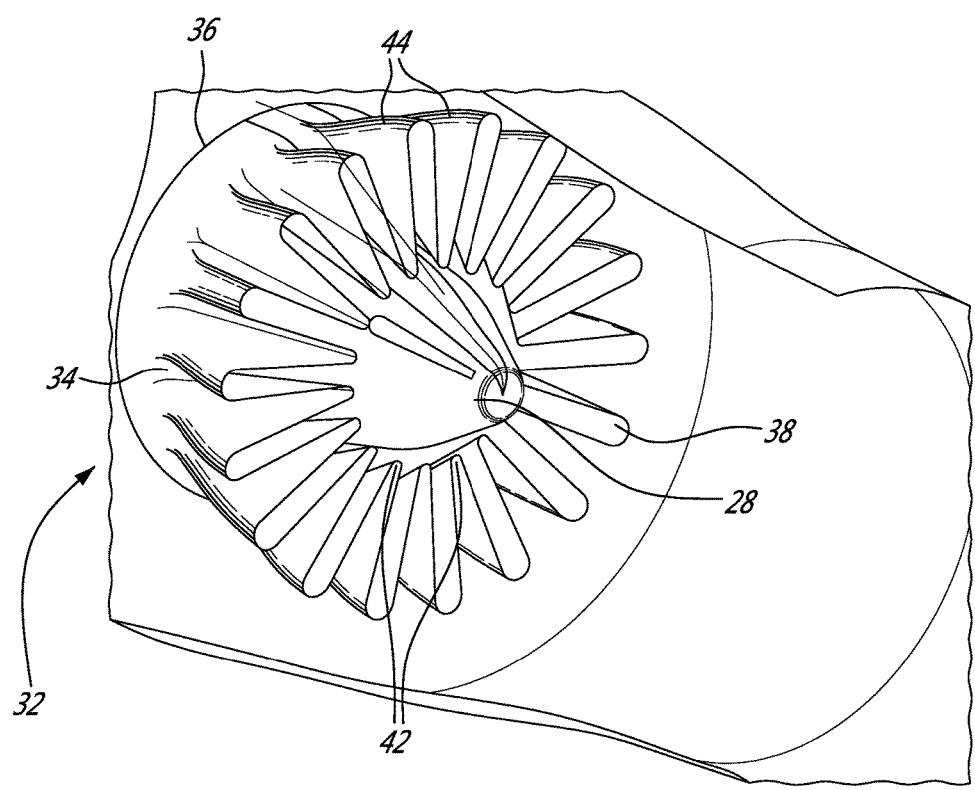
FIG. 2 is a rear isometric view of a forced exhaust mixer.

As shown in FIG. 2, the mixer 32 may include an annular sheet metal wall 34 defining an upstream end 36 of the mixer 32 along which the flows from the core flow path 26 and from the bypass passage 24 are received, and a downstream end 38 where the two flows meet and are mixed together. The annular wall 34 defines a plurality of circumferentially distributed lobes. The lobes include alternating inner and outer lobes or valleys and crests 42, 44, with the crests 44 extending radially outwardly into the bypass passage 24 and the valleys 42 extending radially inwardly into the core flow path 26. As such, the valleys 42 define troughs in the bypass passage 24 in between adjacent ones of the crests 44, while the crests 44 define troughs in the core flow path 26 in between adjacent ones of the valleys 42.

Figure 3:
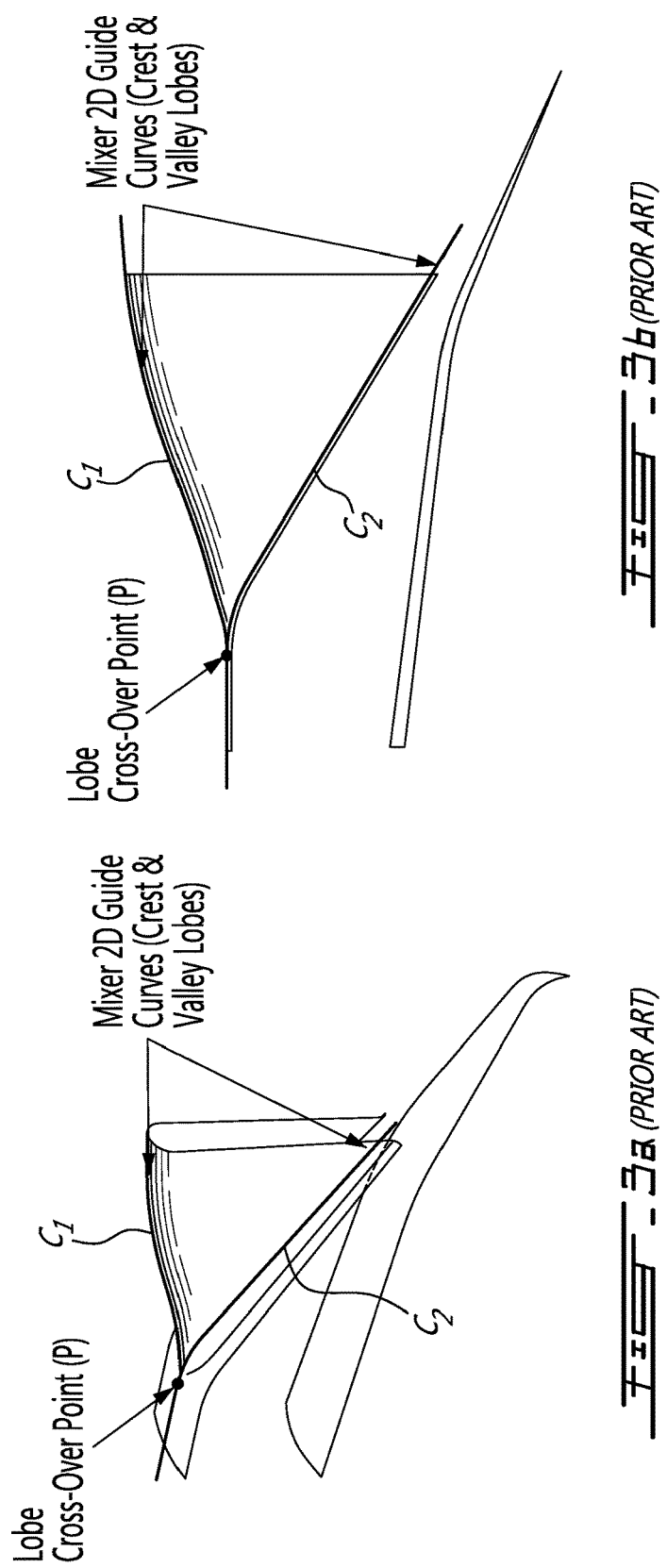
FIGS. 3a and 3b are respectively isometric and side views of a sector of a conventional mixer having a single-point cross-over.

As can be appreciated from FIGS. 3a and 3b, conventional turbofan forced mixers have a single-point cross-over P. That is the curve C1 that forms the crest line and the curve C2 that forms the valley line depart from the annular gaspath at a same axial location. Due to the 3-D geometrical shape that results from this construction, there is an inherent axial variation in cross-sectional area and Mach number on the core and bypass streams that is detrimental to the aerodynamic performance of the mixer. Specifically, the area of the core is reduced which must then be recovered through additional diffusion in the mixer. This requirement of extra diffusion limits the geometrical design of the mixer, often requiring additional length.

Figure 4:
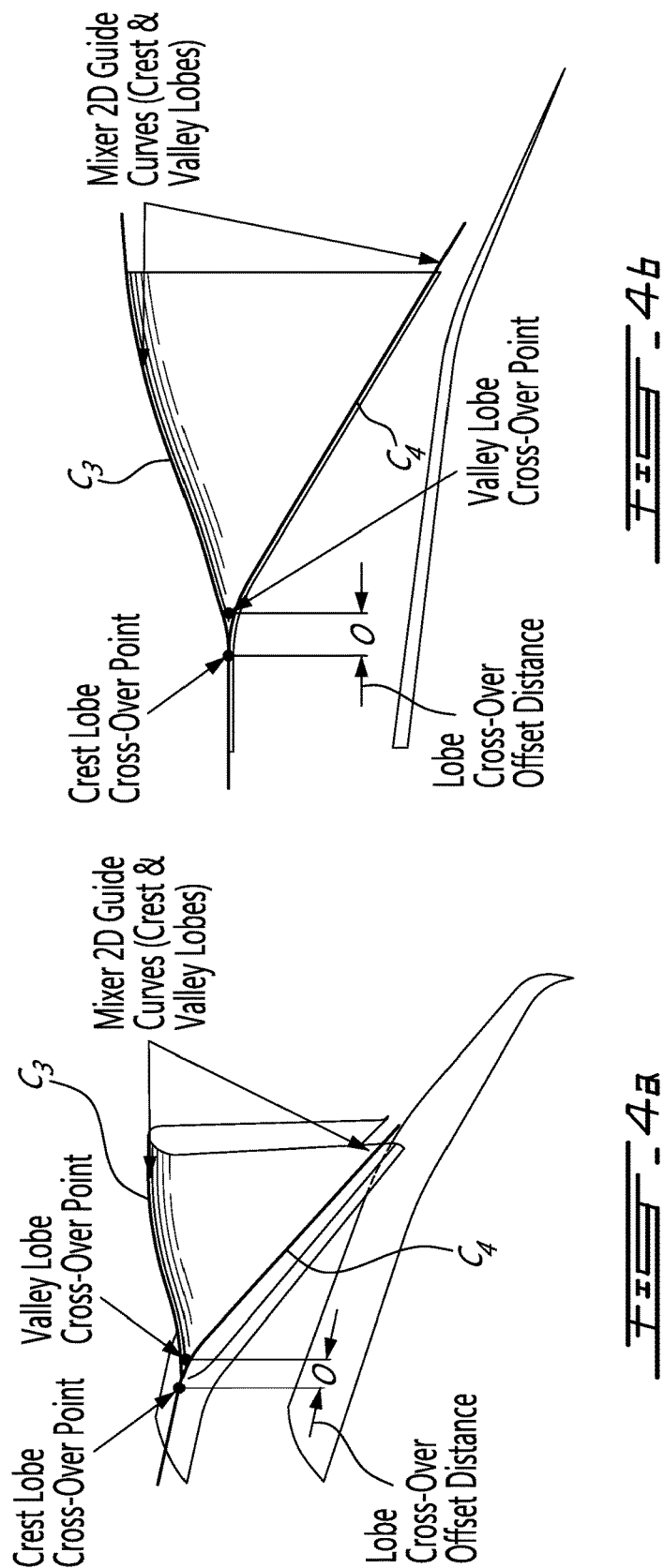
FIGS. 4a and 4b are respectively isometric and side views of a sector of a mixer having a lobe cross-over offset in accordance with an embodiment of the present disclosure.

In contrast, the embodiment shown in FIGS. 4a and 4b provides for a lobe cross-over offset O. Indeed, instead of the curves that define the crest and valley originating from the same axial location, the start of at least some of the valleys and crests may be offset axially relative to each other. In the illustrated embodiment, the curve C3 of the crests starts axially upstream of the curve C4 of the valleys. However, it is understood that the lobe-cross-over offset may be in the opposite direction (i.e. the valleys could start upstream of the crests). Also, a mixer could have more than one lobe cross-over offset O. That is the length of the lobe cross-over offsets could differ between lobes of a same mixer. For example, if de-swirling struts counts (either in conventional or integrated configuration) would not match the number of mixer lobes, one may apply a different lobe cross-over offset for the set of the valley lobes aligning with de-swirling strut than for the remaining valley lobes.

The 3-D shape that results from the lobe distribution shown in FIGS. 4a and 4b allows for a uniform axial distribution of area at the start (i.e. upstream end) of the mixer. It may lead to specific fuel consumption (SFC) improvements. With the elimination of the area variation of the core and bypass, an efficient control of area distribution through the entire mixer can be achieved for improved aerodynamic performance of the exhaust by:
 1. Reduced losses in the core stream
 2. More efficient control of mass flow distribution of the hot stream
 3. Allowing for shorter mixer, thus, longer mixing length for fixed exhaust length increasing the mixing efficiency of the exhaust system.

Figure 5:
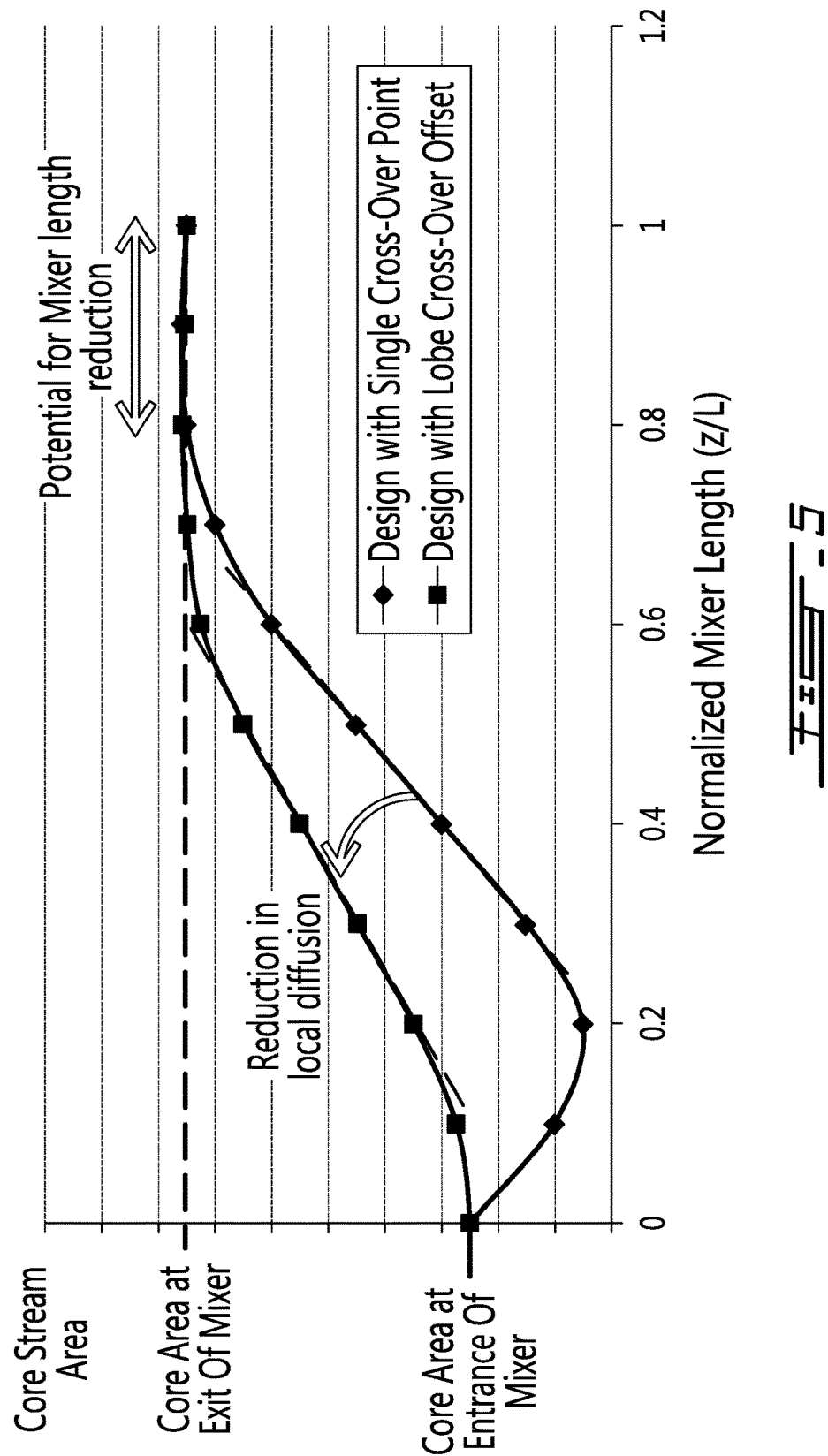
FIG. 5 is a graph representation of a sample area distribution along the mixer for a core stream.

FIG. 5 graphically illustrates sample area distributions along the mixer for the core stream; both, distributions from standard single point cross-over design (FIGS. 3a-3b) and design based on the cross-over offset (FIGS. 4a-4b) being depicted. Sample reduction in local diffusion in the core stream and opportunity for reduced mixer length allowed by proposed features are highlighted; these can yield significant improvement in engine performance. Furthermore, the mixer length reduction allow for weight reduction.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A turbofan exhaust mixer comprising an annular wall extending around a central axis, the annular wall extending axially from an upstream end to a downstream end and defining a plurality of circumferentially distributed lobes, the plurality of circumferentially distributed lobes including alternating valleys and crests, the valleys and crests having respective upstream ends, the annular wall, at its downstream end, extending radially relative to the central axis from a radially inward-most location defined by two adjacent ones of the valleys to a radially outward-most location defined by one of the crests located between the two adjacent ones of the valleys, the upstream ends of at least some of the valleys being axially spaced-apart from the upstream ends of the crests by a lobe cross-over offset distance (O).

2. The turbofan exhaust mixer defined in claim 1, wherein at least some of the crests commence upstream of the valleys.

3. The turbofan exhaust mixer defined in claim 1, wherein the exhaust mixer has different lobe cross-over offset distances (O) around a circumference of the exhaust mixer.

4. The turbofan exhaust mixer defined in claim 1, wherein the valleys and crests comprise at least a first group of valleys and crests and at least a second group of valleys and crests, and wherein the lobe cross-over offset distance (O) of the first group of valleys and crests differs from the lobe cross-over offset distance (O) of the second group of valleys and crests.

5. A gas turbine engine comprising: an annular core flow passage for channeling a core flow along an axis of the engine, a bypass passage extending concentrically about the core flow passage for axially channeling bypass air; and an exhaust mixer, the exhaust mixer having an annular wall concentrically disposed relative to the axis of the engine and extending axially between an upstream end and a downstream end, the annular wall defining a plurality of circumferentially distributed lobes forming alternating crests and valleys, the crests protruding radially outwardly into the bypass passage and the valleys protruding radially inwardly into the core flow passage, the annular wall, at its downstream end, extending radially relative to the axis from a radially inward-most location defined by two adjacent ones of the valleys to a radially outward-most location defined by one of the crests located between the two adjacent ones of the valleys, wherein an origin of the crests at the upstream end of the annular wall of the exhaust mixer is axially offset from an origin of the valleys by a lobe cross-over offset distance (O).

6. The gas turbine engine defined in claim 5, wherein the origin of at least some of the crests is disposed axially upstream of the origin of the valleys relative to a flow direction across the exhaust mixer.

7. The gas turbine engine defined in claim 5, wherein the exhaust mixer has different lobe cross-over offset distances (O) around a circumference of the exhaust mixer.

8. The gas turbine engine defined in claim 5, wherein said crests and valleys include first and second groups of crest and valleys, and wherein said first and second groups of crests and valleys have different cross-over offset distances (O).

9. The gas turbine engine defined in claim 5, wherein the origin of the valleys is disposed axially upstream of the origin of the crests.

10. An exhaust mixer for a gas turbine engine having an annular core flow passage for channeling a core flow along an axis of the engine, and a bypass passage extending concentrically about the core flow passage for axially channeling bypass air; the exhaust mixer comprising: an annular wall adapted to be concentrically disposed relative to the axis of the engine and extending axially between an upstream end and a downstream end, the annular wall defining a plurality of circumferentially distributed alternating crests and valleys, the crests being configured to protrude radially outwardly into the bypass passage while the valleys are configured to protrude radially inwardly into the core flow passage, the annular wall, at its downstream end, extending radially relative to the axis from a radially inward-most location defined by two adjacent ones of the valleys to a radially outward-most location defined by one of the crests located between the two adjacent ones of the valleys, wherein an upstream end of at least some of the crests is axially offset from an upstream end of the valleys.

11. The exhaust mixer defined in claim 10, wherein the upstream end of the crests is axially spaced from the upstream end of the valleys by a predetermined lobe cross-over offset distance.

12. The exhaust mixer defined in claim 11, wherein the upstream end of the crests is disposed upstream of the upstream end of the valleys.

13. The exhaust mixer defined in claim 12, wherein the predetermined lobe cross-over offset distance varies around a circumference of the annular wall.

14. The exhaust mixer defined in claim 12, wherein the valleys and crests comprise at least first and second groups of valleys and crests, and wherein the lobe cross-over offset distance of the first group differs from the lobe cross-over offset distance of the second group.

* * * * *